United States Patent [19]
Matsuda et al.

[11] Patent Number: 5,880,173
[45] Date of Patent: Mar. 9, 1999

[54] HYDROLYZABLE METAL-CONTAINING RESIN AND ANTIFOULING PAINT COMPOSITION

[75] Inventors: Masayuki Matsuda; Jyoji Kitakuni, both of Osaka; Kiyoaki Higo, Ikoma; Chiharu Uchida, Okayama, all of Japan

[73] Assignee: Nippon Paint Co., Ltd., Japan

[21] Appl. No.: 793,536

[22] PCT Filed: Aug. 14, 1995

[86] PCT No.: PCT/JP95/01625

§ 371 Date: Feb. 25, 1997

§ 102(e) Date: Feb. 25, 1997

[87] PCT Pub. No.: WO96/06870

PCT Pub. Date: Mar. 7, 1996

[30] Foreign Application Priority Data

Sep. 1, 1994 [JP] Japan ..................................... 6-232271

[51] Int. Cl.$^6$ ...................................................... C08F 20/06
[52] U.S. Cl. ............................................ 523/122; 526/241
[58] Field of Search ......................... 523/122; 525/329.5, 525/329.6, 330.2; 526/240, 241

[56] References Cited

U.S. PATENT DOCUMENTS

| | | | |
|---|---|---|---|
| 4,085,264 | 4/1978 | Seib | 525/329.5 |
| 4,146,698 | 3/1979 | Anderson | 526/240 |
| 4,485,197 | 11/1984 | Yokoi | 526/240 |
| 4,517,330 | 5/1985 | Zdanowski | 525/329.5 |
| 4,774,080 | 9/1988 | Yamamori | 525/330.2 |
| 4,914,141 | 4/1990 | Matsuo | 523/122 |
| 4,963,631 | 10/1990 | Randell | 526/240 |
| 5,149,745 | 9/1992 | Owens | 525/329.5 |
| 5,199,977 | 4/1993 | Yamamori et al. | 106/15.05 |
| 5,439,993 | 8/1995 | Ito | 526/240 |

*Primary Examiner*—Paul R. Michl
*Attorney, Agent, or Firm*—Millen, White, Zelano, & Branigan, P.C.

[57] ABSTRACT

A substrate resin having pendant acid groups is produced by copolymerizing an acrylic or methacrylic ester of which alcoholic residue includes a bulky hydrocarbon radical or a soft segment. The substrate resin is then metallized together with an organic mobobasic acid so that both of the pendant acid group and the organic monobasic acid group are bount to the same metal atom. The resulting hydrolyzable metal-containing resin is incorporated into self-polishing antifouling paint formulations together with an antifouling pigment such as cuprous oxide.

8 Claims, No Drawings

HYDROLYZABLE METAL-CONTAINING RESIN AND ANTIFOULING PAINT COMPOSITION

BACKGROUND ART

This invention relates to a hydrolyzable, metal-containing resin for use as a vehicle resin of antifouling paints as well as antifouling paint compositions containing said resin.

Antifouling paints containing as a vehicle resin a trialkyltin-containing polymer are known. These resins are advantageous in controlling the release of antifouling agent to a minimum level sufficient to maintain desired antifouling effect at a constant level for a long period of time. In application, the vehicle resin consisting of a trialkyltin-containing polymer is hydrolyzed by the action of weakly alkaline sea water to release the trialkyltin, and at the same time the resin becomes water-soluble so that the paint film is consumed and smoothed. This contributes to the reduction of the frictional resistance of ships against water and, therefore, to the reduction of fuel cost.

The vehicle resins of this type of paints, known as "self-polishing paints", typically consist of copolymers of trialkyltin (meth)acrylate with other comonomers free from carboxyl group. However, strong concern about the toxic effect of trialkyltin on the ecological system has led to a demand for a new vehicle resin which may replace the trialkyltin-containing polymers in the formulation of self-polyshing antifouling paints.

JP-A-62101653, JP-A-62057646, JP-A-63128008 and JP-A-63128084 disclose a metal-containing resin in which a metal atom is ionically combined with an acid pendant group of the resin and further with a monobasic organic acid, and methods of production of such resins. This type of resins may also be hydrolyzed gradually in the sea water to release antifouling metal ions and become soluble by themselves so as to achieve self-polishing effects.

The metal-containing resins are produced by copolymerizing an unsaturated organic acid monomer with a neutral monomer to prepare an acid group-containing resin (hereinafter referred to as "substrate resin"), and then combining the metal and monobasic organic acid. However, the effects of neutral monomers present in the substrate resin on the film performance of antifouling paint formulations containing metallized substrate resins and antifouling pigments have not been investigated well until now. This is because the dissolution rate of films, for example, has long been believed to be affected mainly by the acid number of the subsrate resin but not with the nature of neutral monomers significantly.

DISCLOSURE OF THE INVENTION

We have found that a substrate resin containing certain types of neutral monomers may exhibit, when compared with the corresponding substrate resin not containing such a neutral monomer, enhanced film performance including anti-cracking, adhesive, self-polishing and other properties after metallizing and formulating into an antifouling paint with an antifouling pigment.

The present invention provides a hydrolyzable, metal-containing resin comprising a polymer having in the molecule thereof a plurality of pendant acid groups bound ionically to a metal atom and a monobasic organic acid also bound to the same metal atom as said pendant acid group. It also provides an antifouling paint composition comprising said metal-containing resin and an antifouling pigment and/or antifouling agent. The metal-containing resin according to the present invention is comprised of, in its free acid (substrate resin) form, a copolymer consisting essentially of (a) from 5 to 70% by weight of a member selected from the group consisting of a (meth)acrylic acid ester having as the ester residue a branched alkyl of four or more carbon atoms having at least one branch on a carbon atom at second to fourth positions from the distal end of the principal chain, a (meth)acrylic acid ester having as the ester residue a cycloalkyl residue having six or more carbon atoms, a polyalkylene glycol mono(meth)acrylate, a polyoxyalkylene glycol monoalkyl ether mono(meth)acrylate, and an adduct of 2-hydroxyethyl (meth)acrylate with caprolactone;

(b) a proportion of a polymerizable unsaturated organic acid monomer corresponding to an acid number of the resin from 25 to 350 mg KOH/g as solid; and (c) the balance of another polymerizable neutral monomer.

PREFERRED EMBODIMENTS

The hydrolyzable, metal-containing resin of the present invention may be produced by the methods disclosed in the above-cited patent applications except that the monomeric composition of the substrate resin additionally contains a neutral monomer as defined herein. The pendant acid group e.g. —COOH group binds ionically to a transitional metal, e.g. copper and a monobasic acid, e.g. acetic acid to form the following salt:

—COOCuOAc

The substrate resin having pendant acid groups may be produced by copolymerizing the above monomer (a) with the monomer (b) having an acid group and the monomer (c) free of the acid group in accordance with the conventional solution polymerization method.

Examples of carboxylic acid monomers are acrylic and methacrylic acids. Other examples of carboxyl group-containing monomers include monoalkyl maleate and monoalkyl itaconate as well as half esters of dicarboxylic acid such as phthalic, succinic or maleic acid with 2-hydroxyalkyl (meth)acrylate.

Examples of sulfonic group-containing monomers include p-styrenesulfonic acid, 2-methyl-2-acrylamidopropanesulfonic acid and the like.

Examples of phosphoric group-containing monomers include acid phosphoxypropyl methacrylate, 3-chloro-2-acid phosphoxypropyl methacrylate, acid phosphoxyethyl methacrylate and the like.

The monomeric composition of the substrate resin should contain the acid group-containing monomer in a proportion corresponding to an acid number of the resulting copolymer of from 25 to 350 mg KOH/g as solid. An acid number within this range may generally be reached by compounding the acid monomer in a proportion of from 5–70%, preferably from 10 to 50% by weight of the entire monomeric composition. When the proportion of acid monomer lies within the above range, the balance between the durability and the dissolution rate (self-polishing rate) of paint films may be optimized.

In order to impart the paint films with improved adhesion, anti-cracking and other properties, a (meth) acrylic ester monomer containing a bulky group or soft segment in the ester residue is copolymerized. Typical examples of bulky monomers are t-butyl acrylate and t-butyl methacrylate. Other examples of bulky monomers include (meth)acrylic acid esters having as etser residue a branched alkyl of four or more carbon atoms having at least one branch on a carbon atom at second to fourth positions from the distal end of the principal chain such as isobutyl, isopentyl, neopentyl or isohexyl (meth)acrylate, as well as (meth)acrylic acid esters having as ester residue a cycloalkyl of six or more carbon atoms such as cyclohexyl or isobornyl (meth)acrylate.

Polyoxyalkylene chains produced by the ring-opening polymerization of an alkylene oxide such as ethylene oxide or propylene oxide are known to be a soft segment. Examples of (meth)acryalte acid esters containing as soft segment a polyoxyalkylene chain include polyoxyalkylene glycol mono(meth)acrylate and polyoxyalkylene glycol monoalkyl ether (meth)acrylate. Polyoxyethylene (n=8) glycol monomethyl ether methacrylate and polyoxyethylene (n=23) glycol monomethyl ether methacrylate are commercially available from Shin Nakamura Kagaku K. K. as NK ESTER M-90G and NK ESTER M-230G, respectively. Another example of soft segment-containing acrylic monomers is an adduct of 2-hydroxyethyl (meth)acrylate with caprolactone. These monomers are also commercially available from Daicel Chemical Industries, Ltd. as PLACCEL FA and PLACCEL FM series.

Medium and long chain alkyl (meth)acrylates are not usable alone because of their high hydrophobicity but usable in combination with a hydrophilic, soft segment-containing acrylic monomer such as NK ESTER M-90G or NK ESTER M-230G.

The substrate resin should contain in its monomeric composition 5–70%, preferably 10–50% by weight of the entire monomeric composition of the above monomer for improving adhesion and anti-cracking properties of paint films. When the proportion of this kind of monomers lies within the above range, it is possible for the metallized paint films to impart with improved adhesion and durability as well as a constant dissolution rate in the presence of an antifouling pigment without affecting other properties.

The balance of monomeric composition of the substrate resin is occupied by a neutral monomer other than the monomers (a) and (b). Examples thereof include hydrocarbon monomers such as ethylene, propylene, styrene, α-methylstyrene, and vinyltoluene; alkyl (meth)acrylates such as methyl (meth)acryalte, ethyl(meth)acrylate, n-propyl (meth)-acrylate and n-butyl (meth)acrylate; hydroxyalkyl (meth)-acrylates such as 2-hydroxyethyl (meth)acrylate and hydroxypropyl (meth)acrylate; amides such as acrylamide and methacrylamide; nitrites such as acrylonitrile and methacrylonitrile; esters such as vinyl acetate and vinyl propionate; and vinyl chloride.

The substrate resin preferably has a number average molecular weight from 2,000 to 100,000, more preferably from 3,000 to 40,000. The substrate resin is required to have a molecular weight of the above range to maintain an optimal balance among the film-forming property, workability and dissolution rate.

Metals forming a salt with the substrate resin are chosen from elements of groups 3A to 7A, 8, 1B and 2B of the periodic chart. Cobalt, nickel, copper, zinc, tellurium and manganese are preferable among others.

Polymeric metal salts may be produced by reacting the substrate resin with at least a stoichiometric amount of a metal compound such as oxide, hydroxide, chloride, sulfide or basic carbonate and at least a stoichiometric amount of a monobasic organic acid simultaneously. Alternatively, the substrate resin may be reacted with a metal salt of monobasic organic acid.

Examples of monobasic organic acids used for this purpose include monocarboxylic acids such as acetic, propionic, butyric, lauric, stearic, linolic, oleic, naphthenic, chloroacetic, fluoroacetic, abietic, phenoxyacetic, valeric, dichlorophenoxyacetic, benzoic, or naphthoic acid; and monosulfonic acids such as benzenesulfonic, p-toluenesulfonic, dodecylbenzenesulfonic, naphthalenesulfonic or p-phenylbenzenesulfonic acid.

A preferred method for producing the polymeric metal salt is disclosed in JP-A-63128008 cited hereinbefore. According to this method, the substrate resin is reacted with a metal salt of low boiling point-monobasic acid and a free high boiling point-monobasic acid simultaneously to form a polymeric metal salt in which both the resin pendant acid anion and the high boiling point-monobasic acid anion are bound to the same metal cation. The term "low and high boiling point-monobasic acids" as used herein reffered to the existence of substantial difference in boiling points therebetween, for example 20° C.

The hydrolyzable, metal containing resin thus produced may be incorporated into antifouling paint formulations in combination with an antifouling agent and other conventional additives to prepare the self-polishing antifouling paint composition of the present invention.

The antifouling paint composition according to the present invention may contain the following conventional additives.

(1) Antifouling agent:

Powders or flakes of copper, zinc and nickel; oxides, halides or hydroxides of copper, zinc and lead; organotin compounds such as tributyltin fluoride or triphenyltin chloride; biocidal metal carboxylates such as copper naphthenate or copper stearate; metal (e.g. Na, K, Zn, Pb, Cu, Fe, Ni, Mg, Se) dialkyl dithiocarbamates such as zinc dimethyl dithiocarbamate and thiuram disulfide; sulfamides such as phthalylsulfathiazole, sulfaethydole, sulfanilidopyridine or sulfamethoxyine; antibiotics such as penicillin V, penicillin G, ampicillin, cephalosporin, chlortetracycline, neomycin, rifamycin or variotin; pyrrole and imidazole compounds such as glyodine, fentizole or polycide; thioxane and thioxanthone compounds such as terazol, asterol or mylone; amides such as nicarbazin, 3,4,5-tribromosalicylanilide, N-trichloromethyl-mercaptophthalimide or 3,5-dinitrobenzamide; and other known antifouling agents, pesticides, bacteriocides and fungicides.

(2) Plasticizer:

Phthalate plasticizers such as dioctyl phthalate, dimethyl phthalate or dicyclohexyl phthalate; aliphatic dicarboxylate plasticizers such as butyl sebacate; glycol ester plasticizers such as diethylene glycol dibenzoate or pentaerythritol alkanoic etser; phosphate plasticizers such as tricresyl phosphate or trichloroethyl phosphate; epoxy plasticizers such as epoxydized soybean oil or epoxydized octyl stearate; organotin plasticizers such as dioctyltin dilaurate or dibutyltin dilaurate; and other plasticizers such as trioctyl trimellitate, camphor or triacetin.

(3) Hydrolysis regulator:

Chlorinated paraffin, polyvinyl ether, polypropylene sebacate, partially hydrogenated terphenyl, polyvinyl acetate, polyalkyl (meth)acrylate, polyether polyol, alkyd resin, polyester resin and polyvinyl chloride.

(4) Pigment:

Extender pigments such as baryte, precipitated barium sulfate, talc, clay, chalk, silica white, alumina white, titanium white or bentonite; color pigments such as titanium dioxide, zirconium dioxide, basic lead sulfate, tin oxide, carbon black, graphite, red iron oxide, chromium green, emerald green or phthalocyanine blue.

(5) Solvent:

Hydrocarbons such as xylene, toluene, benzene, ethylbenzene, cyclopentane, octane, heptane, cyclohexane or white spirit; ethers such as dioxane, tetrahydrofuran, ethylene glycol monomethyl ether, ethylene glycol monoethyl ether, ethylene glycol dimethyl ether, ethylene glycol monobutyl ether, ethylene glycol dibutyl ether, diethylene glycol monomethyl ether or diethylene glycol monoethyl ether; esters such as butyl acetate, propyl acetate, benzyl acetate, ethylene glycol monomethyl ether acetate or ethylene glycol monoethyl ether acetate; ketones such as methyl isobutyl ketone or ethyl isobutyl ketone; and alcohols such as n-butanol or propyl alcohol.

(6) Viscosity regulator:

Amides and amines such as nicotinamide or n-octylamine; monobasic organic acids such as acetic, oleic or lauric acid; phosphoric acid and phosphate esters; solid acids such as silicate or molybdate.

(7) Other additives:

Monobasic organic acids such as rosin, monobutyl phthalate or monooctyl succinate; camphor and castor oil.

The antifouling paint composition of the present invention may be prepared by the method known per se in the art. Any known machine such as ball mills, pebble mills, roll mills or spead run mills may be used for mixing various ingredients.

It is desirable for the antifouling paint of the present invention that the hydrolyzable resin occurs as a salt with a metal having ionization tendency lower than that of alkali metals, e.g. the zinc, copper or tellurium salt. When such a salt is chosen, the paint films applied on ships, fish nets or marine construction will be gradually hydrolyzed and dissolved out into weakly alkaline sea water. Opposite to polyester vehicle resins containing a number of metal ester moieties in the polymer backbone, the vehicle resin of the present invention are not decomposed rapidly into a large number of soluble fragments, but only pendant groups thereof are hydrolyzed into a hydrophilic group before the concentration or density of such hydrophilic groups reach at a threshold level at which the paint film begins to dissolve in the sea water. Accordingly, when said vehicle resin is used, it is possible to give an antifouling paint film exhibiting the antifouling and other performance for a long period of time. Therefore, the antifouling paint composition according to the present invention finds use in finishing not only ships including tankers, ferry boats, steel boats, wood boats and FRP boats but also various marine construction and fish nets.

Besides, particular advantages are achieved when the hydrolyzable, metal-containing resin of the present invention is combines with a copper-based antifouling pigment such as cuprous oxide or copper rhodanide. This is because the interaction between the vehicle resin and the antifouling pigment is remarkably retarded when compared to the corresponding resin not containing a neutral monomer as defined herein. As a result, the film performance including integrity, adhesion strength and self-polishing property may be significantly improved.

The invention is further illustrated by the following production examples, examples and comparative examples in which all parts are by weight.

EXAMPLES

Production Example 1 (Varnish)

To a four necked flask equipped with a stirrer, reflux condenser, nitrogen gas tube and drip funnel were added 64 parts of xylene and 16 parts of n-butanol. After heating the content to 100° C., a mixture of 58.3 parts of ethyl acrylate, 15 parts of cyclohexyl methacrylate, 10 parts of NK ESTER M-90G (methoxypolyethylene glycol methacrylate sold by Shin Nakamura Kagaku K. K.), 16.7 parts of acrylic acid and 2 parts of t-butylperoxy 2-ethylhexanoate was added dropwise at a constant rate over 3 hours. After the addition, the mixture was kept at the same temperature for 30 minutes. Then, a solution of 0.2 parts t-butylperoxy 2-ethylhexanoate in 16 parts of xylene and 4 parts of n-butanol was added dropwise at a constant rate over 30 minutes. Thereafter the reaction mixture was kept at the same temperature for 1.5 hours. A resin solution called Varnish A having 49.8% solids, a viscosity of 4.4 poise and an acid number of 130 (as solids, the same hereinafter) was obtained.

Production Example 2 (Varnish)

A mixture of 50 parts of xylene and 50 parts of n-butanol was heated to 90° C. in the same flask as used in Production Example 1. To this was added dropwise a mixture of 54.6 parts of ethyl acrylate, 7.4 parts of methyl methacrylate, 16.7 parts of acrylic acid, 21.3 parts of t-butyl methacrylate and 2 parts of azobisisobutyronitrile at a constant rate over 3 hours. After the addition, the mixture was kept at the same temperature for 2 hours. A resin solution called Varnish B having 50.1% solids, a viscosity of 5.2 poise and a resin acid number of 130 was obtained.

Production Example 3 (Varnish)

A mixture of 40 parts of xylene and 40 parts of n-butanol was heated to 100° C. in the same flask as used in Production Example 1. To this was added dropwise a mixture of 65.7 parts of ethyl acrylate, 15 parts of cyclohexyl methacrylate, 19.3 parts of acrylic acid and 2 parts of t-butylperoxy 2-ethylhexanoate at a constant rate over 3 hours. After the addition, the mixture was kept at the same temperature for 30 minutes. Then a solution of 0.2 parts of t-butylperoxy 2-ethylhexanoate in 10 parts of xylene and 10 parts of n-butanol was added dropwise at a constant rate over 30 minutes. Thereafter the reaction mixture was kept at the same temperature for 1.5 hours. A resin solution called Varnish C having 50.0% solids, a viscosity of 6.5 poise and a resin acid number of 150 was obtained.

Production Example 4 (Varnish)

A mixture of 64 parts of xylene and 16 parts of n-butanol was heated to 90° C. in the same flask as used in Production Example 1. To this was added dropwise a mixture of 25.0 parts of isobutyl methacrylate, 33.0 parts of ethyl acrylate, 22.7 parts of methyl methacrylate, 19.3 parts of acrylic acid and 2 parts of azobisisobutyronitrile at a constant rate over 3 hours. After the addition, the mixture was kept at the same temperature for 30 minutes. Then a solution of 0.2 parts of azobisisobutyronitrile in 16 parts of xylene and 4 parts of n-butanol was added dropwise at a constant rate over 30 minutes. Thereafter the reaction mixture was kept at the same temperature for 2 hours. A resin solution called Varnish D having 49.5% solids, a viscosity of 7.8 poise and a resin acid number of 150 was obtained.

Production Example 5 (Varnish)

A mixture of 64 parts of xylene and 16 parts of n-butanol was heated to 100° C. in the same flask as used in Production Example 1. To this was added dropwise a mixture of 10.2 parts of 2-ethylhexyl methacrylate, 66.8 parts of ethyl acrylate, 11.4 parts of NK ESTER M-90G, 11.6 parts of acrylic acid and 2 parts of t-butylperoxy 2-ethylhexanoate at a constant rate over 3 hours. After the addition, the mixture was kept at the same temperature for 30 minutes. Then a solution of 0.2 parts of t-butyl 2-ethylhexanoate in 16 parts of xylene and 4 parts of n-butanol was added dropwise at a constant rate over 30 minutes. Thereafter the reaction mixture was kept at the same temperature for 1.5 hours. A resin solution called Varnish E having 50.3% solids, a viscosity of 4.7 poise and a resin acid number of 90 was obtained.

Production Example 6 (Varnish)

A mixture of 64 parts of xyylene and 16 parts of n-butanol was heated to 100° C. in the same flask as used in Production Example 1. To this was added dropwise a mixture of 20.0 parts of isobutyl acrylate, 50.9 parts of ethyl acrylate, 14.1 parts of acrylic acid, 15.0 parts of NK ESTER M-90G and 3 parts of t-butylperoxy 2-ethylhexanoate at a constant rate over 4 hours. After the addition, the mixture was kept at the same temperature for 30 minutes. Then a solution of 0.2 parts of t-butylperoxy 2-ethylhexanoate in 16 parts of xylene and 4 parts of n-butanole was added dropwise at a constant rate over 30 minutes. Thereafter the reaction mixture was kept at the same temperature for 2 hours. A resin solution called Varnish F having 50.0% solids, a viscosity of 7.5 poise and a resin acid number of 110 was obtained.

Production Example 7 (Varnish for comparison)

A mixture of 64 parts of xylene and 16 parts of n-butanol was heated to 100° C. To this was added dropwise a mixture of 54.1 parts of ethyl acrylate, 26.6 parts of methyl methacrylate, 19.3 parts of acrylic acid and 3 parts of azobisisobutyronitrile at a constant rate over 4 hours. After the addition, the mixture was kept at the same temperature for 30 minutes. Then a solution of 0.2 parts of azobisisobutyronitrile in 16 parts of xylene and 4 parts of n-butanol was added dropwise at a constant rate over 30 minutes. Thereafter the reaction mixture was kept at the same temperature for 1.5 hours. A resin solution called Varnish G having 50.5% solids, a viscosity of 4.5 poise and a resin acid number of 150 was obtained.

Production Example 8 (Varnish for comparison)

A mixture of 50 parts of xylene and 50 parts of n-butanol was heated to 100° C. in the same flask as used in Production Example 1. To this ws added dropwise a mixture of 45.6 parts of ethyl acrylate, 32.5 parts of methyl methacrylate, 10.3 parts of 2-hydroxyethyl acrylate, 11.6 parts of acrylic acid and 1.5 parts of t-butylperoxy 2-ethylhexanoate at a constant rate over 3 hours. After the addition, the reaction mixture was kept at the same temperature for 2 hours. A resin solution called Varnish H having 49.8% solids, a viscosity of 12.9 poise and a resin acid number of 90 was obtained.

Example 1

A four necked flask equipped with a stirrer, nitrogen gas tube, reflux condenser, decanter and temperature control means was charged with 100 parts of Varnish A, 25.4 parts of zinc acetate, 24.4 parts of SA-13 (mixture of aromatic sulfonic acids sold by Idemitsu Petrochemical Co., Ltd.) and 140 parts of xylene. The mixture was heated at 130° C. while distilling off acetic acid produced as a by-product with solvent. The end point of the reaction was confirmed by determining the quantity of acetic acid in the effluent solvent. A varnish having 40.2% solids and a viscosity of U–V was obtained.

Example 2

The same flask as used in Example 1 was charged with 100 parts of Varnish B, 18.6 parts of copper oxalate, 32.7 parts of oleic acid and 120 parts of xylene. The mixture was heated at 120° C. while distilling off oxalic acid with solvent. A varnish having 42.5% solids and a viscosity of $Z_1$–$Z_2$ was obtained.

Example 3

The same flask as used in Example 1 was charged with 100 parts of Varnish C, 21.5 parts of copper oxalate, 37.5 parts of naphthenoic acid and 120 parts of xylene. The mixture was heated at 120° C. while distilling off oxalic acid with solvent. A varnish having 31.7% solids and a viscosity of Y–Z was obtained.

Example 4

The same flask as used in Example 1 was charged with 100 parts of Varnish A, 24.0 parts of copper acetate, 32.4 parts of naphthenoic acid and 100 parts of xylene. The mixture was heated at 130° C. while distilling off acetic acid with solvent. A varnish having 32.5% solids and a viscosity of X was obtained.

Example 5

The same flask as used in Example 1 was charged with 100 parts of Varnish D, 29.3 parts of zinc acetate, 37.8 parts of oleic acid and 120 parts of xylene. The mixture was heated at 130° C. while distilling off acetic acid with solvent. A varnish having 41.3% solids and a viscosity of V–W was obtained.

Example 6

The same flask as used in Example 1 was charged with 100 parts of Varnish D, 26.0 parts of tellurium acetate, 32.7 parts of Versatic acid and 150 parts of xylene. The mixture was heated at 130° C. while distilling off acetic acid with solvent. A varnish having 51.6% solids and a viscosity of S–T was obtained.

Example 7

The same flask as used in Example 1 was charged with 100 parts of Varnish B, 24.0 parts of copper acetate, 32.5 parts of naphthenoic acid and 100 parts of xylene. The mixture was heated at 130° C. while distilling off acetic acid with solvent. A varnish having 40.6% solids and a viscosity of $Z_2$–$Z_3$ was obtained.

Example 8

The same flask as used in Example 1 was charged with 100 parts of Varnish E, 31.6 parts of zinc salicylate, 16.9 parts of SA-13 (Idemitsu Petrochemical) and 150 parts of xylene. The mixture was heated at 120° C. while distilling off salicylic acid with solvent. A varnish having 62.3% solids and a viscosity of V–W was obtained.

Example 9

The same flask as used in Example 1 was charged with 100 parts of Varnish C, 26.7 parts of copper acetate, 22.7 parts of Versatic acid and 100 parts of xylene. The mixture was heated at 130° C. while distilling off acetic acid with solvent. A varnish having 33.4% solids and a viscosity of Z–$Z_1$ was obtained.

Example 10

The same flask as used in Example 1 was charged with 100 parts of Varnish E, 16.0 parts of copper acetate, 22.5 parts of naphthenoic acid and 120 parts of xylene. The mixture was heated at 130° C. while distilling off acetic acid with solvent. A varnish having 60.7% solids and a viscosity of T–U was obtained.

Example 11

The same flask as used in Example 1 was charged with 100 parts of Varnish F, 15.7 parts of copper oxalate, 27.7 parts of oleic acid and 120 parts of xylene. The mixture was heated at 120° C. while distilling off oxalic acid with solvent. A varnish having 50.8% solids and a viscosity of W–X was obtained.

Example 12

The same flask as used in Example 1 was charged with 100 parts of Varnish F, 19.0 parts of tellurium acetate, 37.8 parts of Versatic acid and 150 parts of xylene. The mixture was heated at 130° C. while distilling off acetic acid with solvent. A varnish having 53.4% solids and a viscosity of R was obtained.

Comparative Example 1

The same flask as used in Example 1 was charged with 100 parts of Varnish G, 26.7 parts of copper acetate, 37.5 parts of naphthenoic acid and 100 parts of xylene. The mixture was heated at 130° C. while distilling off acetic acid with solvent. A varnish having 40.7% solids and a viscosity of X–Y was obtained.

Comparative Example 2

The same flask as used in Example 1 was charged with 100 parts of Varnish G, 52.6 parts of zinc salicylate, 28.2 parts of SA-13 (Idemitsu Petrochemical) and 150 parts of xylene. The mixture was heated at 120° C. while distilling off salicylic acid with solvent. A varnish having 37.4% solids and a viscosity of W–X was obtained.

Comparative Example 3

The same flask as used in Example 1 was charged with 100 parts of Varnish H, 16.0 parts of copper acetate, 22.7 parts of oleic acid and 100 parts of xylene. The mixture was heated at 130° C. while distilling off acetic acid with solvent. A varnish having 53.7% solids and a viscosity of W was obtained.

Comparative Example 4

The same flask as used in Example 1 was charged with 100 parts of Varnish H, 12.9 parts of copper oxalate, 27.7 parts of naphthenoic acid and 120 parts of xylene. The mixture was heated at 120° C. while removing oxalic acid with solvent. A varnish having 51.3% solids and a viscosity of Y was obtained.

Clear Film Consumption Test

Each of varnishes of Examples 1–12 and Comparative Examples 1–4 was applied on a test panel to a dry film thickness of about 200 μm. The test panel was attached to a rotating drum tester and rotated continuously at a constant speed (about 15 knot) in the sea water (temperature = 18°–23° C.) for 3 months. The film thickness was measured before and after the test. The results are shown in Table 1.

TABLE 1

| Example | Initial film thickness, μm | Film thickness after 3 months, μm | Comsumed film thickness, μm |
| --- | --- | --- | --- |
| 1 | 193 | 159 | 34 |
| 2 | 187 | 155 | 32 |
| 3 | 212 | 174 | 38 |
| 4 | 197 | 169 | 28 |
| 5 | 218 | 178 | 40 |
| 6 | 189 | 156 | 33 |
| 7 | 175 | 129 | 46 |
| 8 | 199 | 174 | 25 |
| 9 | 194 | 163 | 31 |
| 10 | 223 | 193 | 30 |
| 11 | 219 | 177 | 42 |
| 12 | 201 | 166 | 35 |
| Comp.Ex. 1 | 189 | 114 | 75 |
| Comp.Ex. 2 | 218 | 160 | 58 |
| Comp.Ex. 3 | 203 | 140 | 63 |
| Comp.Ex. 4 | 184 | 139 | 45 |

Examples 13–24 and Comparative Examples 5–8

Various paint compositions were prepared by milling 15 parts as solids of varnishes of Examples 1–12 and Comparative Examples 1–4, 45 parts of cuprous oxide, 4 parts of red iron oxide, 1 part of titanium dioxide, 4 parts of chlorinated paraffin, 1.5 parts of organobentonite and 24.5 parts of xylene (100 parts in total) for 5 hours in a ball mill. Examples 13–24 correspond to Examples 1–12 and Comparative Examples 5–8 correspond to Comparative Examples 1–4, respectively. In Example 20 and Comparative Example 6, copper rhodanide was replaced for cuprous oxide. In Example 15 and Comparative Example 7, 3 parts of 2,5-dichloro-2-n-octyl-3-isothiazolone were incorporated into the paint formulation as an additional antifouling agent.

Film Consumption Test

Each of paints of Examples 13–24 and Comparative Examples 5–8 was applied on a test panel to a dry film thickness of about 200 μm. The test panel was attached to a rotating drum tester and rotated continuously at a constant speed (about 15 knot) in the sea water (temperature = 18°–23° C.) for 3 months. The film thickness was measured before and after the test. The results are shown in Table 2.

TABLE 2

| Example | Initial film thickness, μm | Film thickness after 3 months, μm | Comsumed film thickness, μm |
| --- | --- | --- | --- |
| 13 | 215 | 150 | 65 |
| 14 | 207 | 147 | 60 |
| 15 | 196 | 146 | 50 |
| 16 | 189 | 135 | 54 |
| 17 | 203 | 148 | 55 |
| 18 | 197 | 148 | 49 |
| 19 | 189 | 119 | 70 |
| 20 | 205 | 165 | 40 |
| 21 | 195 | 150 | 45 |
| 22 | 220 | 172 | 48 |
| 23 | 217 | 139 | 78 |
| 24 | 198 | 134 | 64 |
| Comp.Ex. 5 | 193 | 161 | 32 |
| Comp.Ex. 6 | 219 | 194 | 25 |
| Comp.Ex. 7 | 204 | 166 | 38 |
| Comp.Ex. 8 | 198 | 166 | 32 |

Film Integrity/Adhesion Evaluation

Integrity evalution:

Each of paints of Example 13–24 and Comparative Examples 5–8 was applied twice using a paint brush to a dry film thickness of about 100 μm onto a steel plate previously subjected to a sand blast treatment and then coating of a rustproof paint. The test panel was then immersed in the sea water for 6 months, rinsed with water, allowed to stand for one whole day and evaluated for the integrity of the paint film. The evaluation results according to the following schedule are shown in Table 3.

⊙: Very slight cracks (almost not visible)
○: Slight cracks (not greater than about 10% of total area)
X: Cracks (not greater than 30% of total area)
XX: Cracks were found in whole area.

Adhesion evaluation:

Using the same test panel as used in the above test, evalution was conducted for adhesion according the method JIS K 5400. 8 . 5 . 2 . (grid spacing=2 mm, number of grid=25) The results of evaluation in terms of the following score are shown in Table 3.

Score

10: Each scratched line was narrow in width and the both sides thereof remained smooth. Peeling was not seen both at intersections of scratched lines and in individual grids.

8: Slight peeling was found at intersections of scratched lines but not in individual grids. The defective area remained less than 5% of the total square area.

6: Peeling was found both at intersections and either side of the scrathced lines. The defective area extended to 5–15% of the total square area.

4: Wide peeling was found along scratched lines. The defective area extended to 15–35% of the total square area.

2: Wider peeling than that of score 4 was found. The defective area extended to 35–65% of the total square area.

0: The defective area extended to greater than 65% of the total square area.

TABLE 3

| Example | Integrity | Adhesion |
|---|---|---|
| 13 | ⊙ | 10 |
| 14 | ⊙ | 8 |
| 15 | ○ | 8 |
| 16 | ⊙ | 10 |
| 17 | ○ | 8 |
| 18 | ○ | 8 |
| 19 | ⊙ | 8 |
| 20 | ⊙ | 10 |
| 21 | ○ | 8 |
| 22 | ⊙ | 8 |
| 23 | ⊙ | 10 |
| 24 | ⊙ | 10 |
| Comp.Ex. 5 | x | 2 |
| Comp.Ex. 6 | x | 2 |
| Comp.Ex. 7 | Δ | 4 |
| Comp.Ex. 8 | Δ | 4 |

We claim:

1. In a self-polishing anti-fouling paint composition comprising an anti-fouling agent and further comprising a copolymer having a plurality of pendant acid groups ionically bound to a multivalent metal and an organic monobasic acid also ionically bound to the same metal atom as said pendant acid group of said copolymer, the improvement wherein said copolymer consists, in its free acid form, essentially of (a) about 5 to 70% by weight by a monomer selected from the group consisting of (i) a (meth)acrylic ester having as the ester residue thereof a branched alkyl of more than 3 carbon atoms having at least one branch on a carbon atom at second to fourth positions counting from the distal end of the principal chain, (ii) a (meth) acrylic acid ester having the ester residue thereof a cycloalkyl of more than 5 carbon atoms, (iii) a polyalkylene glycol mono(meth)acrylate, (iv) a polyalkylene glycol monoalkyl ether (meth)acrylate, and (v) an adduct of 2-hydroxyethyl (meth) acrylate with caprolactone;

(b) a proportion of a polymerizable unsaturated organic acid monomer corresponding to an acid number of the copolymer of from 25 to 350 mg KOH/g as solid; and (c) the balance of a polymerizable monomer other than said monomers (a) and (b), wherein the multivalent metal is copper, zinc, nickel, cobalt, manganese or tellurium.

2. The self-polishing antifouling paint composition according to claim 1, wherein said monomer (a) is t-butyl methacrylate, isobutyl (meth)acrylate, isopentyl (meth) acrylate, neopentyl (meth)acrylate, isohexyl (meth)acrylate, cyclohexyl (meth)acrylate, isobornyl (meth)acrylate, polyethylene glycol mono(meth)acrylate, polyethylene glycol monomethyl ether (meth)acrylate or an adduct of 2-hydroxyethyl (meth)acrylate with caprolactone.

3. The self-polishing antifouling paint composition according to claim 1, wherein said monomer (b) is acrylic acid or methacrylic acid.

4. The self-polishing antifouling paint composition according to claim 1, wherein said organic monobasic acid is an organic monobasic carboxylic acid.

5. The self-polishing antifouling paint composition according to claim 1, wherein said organic monobasic acid is an organic monobasic sulfonic acid.

6. The self-polishing antifouling paint composition according to claim 1, wherein said antifouling agent is cuprous oxide or copper rhodanide.

7. The self-polishing antifouling paint composition according to claim 1, wherein said monomer (b) is p-styrenesulfonic acid, 2-methyl-2-acrylamidopropanesulfonic acid, phosphoxypropyl methacrylate, 3-chloro-2-acid phosphoxypropyl methacrylate, or acid phosphoxyethyl methacrylate.

8. The self-polishing antifouling paint composition according to claim 1, wherein monomer (c) is ethylene, propylene, styrene, α-methylstyrene, vinyltoluene, methyl (meth)acrylate, ethyl(meth)acrylate, n-propyl (meth)-acrylate, n-butyl (meth)acrylate, 2-hydroxyethyl (meth) acrylate, hydroxypropyl (meth)acrylate, acrylamide, methacrylamide; acrylonitrile, methacrylonitrile, vinyl acetate, vinyl propionate, or vinyl chloride.

* * * * *